2,812,258

DRY LEMON FOOD FLAVORING COMPOSITION AND METHOD OF PREPARING THE SAME

Catherine B. Wright, Staunton, Va.

No Drawing. Application September 8, 1953,
Serial No. 379,082

4 Claims. (Cl. 99—140)

The present invention relates to a flavoring or seasoning means for foodstuffs, and to processes for preparing the same.

It is a primary object of the present invention to provide a novel dry condiment which may be held for long periods in storage without substantial deterioration and which can be quickly and easily prepared for use by the addition thereto of an edible oil or the like.

Another object is to provide a flavoring with a cereal product base for easy digestibility, favorable appearance, and desirable tastiness, even when stored for a considerable length of time, while retaining all of its desirable characteristics and also being very economical in cost. It may be prepared with little effort on the part of the operator.

The essential constituents of my new and improved condiment are powdered citric acid, Parmesan cheese, black pepper, and a dry cereal product, such as cornflakes or crushed ice cream cones.

The dry lemon food flavoring comprising this invention is prepared essentially as follows:

Approximately two parts of powdered citric acid, which imparts the desirable lemon flavor to the final composition, are added to a thoroughly crushed and homogeneous mass of about 64 parts of dry cereal product. The cereal product is preferably of the character of or consists of corn flakes or a well known edible ice cream cone composition. This high proportion of cereal product base serves to dilute the citric acid concentrate so that it will not be harsh upon the tongue, while still retaining the acidic lemon flavor tang therein.

Parmesan cheese, in a proportion equivalent to that of the citric acid concentrate, in this case two parts, is then blended with the aforesaid mixture, imparting thereto a slight cheese taste and aroma.

As the final constituent, one part of ground black pepper is added and mixed therewith.

The resultant dry composition comprises the prepared novel condiment. It is suitably bagged or packaged and may be kept thus until its use is desired.

The proportionate composition of this improved seasoning means is preferably as follows:

Cereal product, approximately 92% or 4 parts.
Dry citric acid, approximately 3% or ⅛ part.
Parmesan or similar cheese, approximately 3% or ⅛ part.
Black pepper, approximately 2% or ¹⁄₁₆ part.

In order to prepare this flavoring for serving, the above described prepared novel food product composition is thereafter mixed or combined with an edible oil, such as "Wesson" oil. Its use thus may be as a basic topping for canapes, when prepared for example in accordance with the following:

Two parts of the dry flavoring composition as constituted above are combined with three parts of warmed "Wesson" oil, to which about one part of flaked paraffin has been added. The paraffin aids in the maintenance of a pasty consistency for easy spreading upon canapes. For added flavor, a small measure of finely chopped beef, for example, may be added.

The entire warmed seasoning composition is then spread upon potato chips to be served with cocktails, or employed as a tasty salad dressing.

As thus described, the flavoring is very easily prepared as a tasty, attractive spread or condiment.

The proportions of the cereal product, cheese, and citric acid employed may be slightly altered without materially varying the desirable novel flavor of the condiment.

Other acids or acid salts adaptable for food use may be employed in the preparation, although citric acid is preferred as that imparting the most desirable flavor.

Whereas the Parmesan cheese ingredient is preferably desirable and is contemplated in the preparation of the dry composition, other similar dry cheeses may be substituted therefor to maintain the highly desirable and delectable cheese tang in the resultant seasoning.

Also the proportions of edible oil mixed with the product before serving may vary with the wishes of the chef or ultimate consumer as regards the desirable consistency of the final product for its particular use.

It will thus be seen that the above described improved dry flavoring composition and manner of preparing the same in the disclosed proportions, results in a highly attractive and tasty food product for the purposes contemplated. The instant invention may be used to advantage, not only as a lemon flavoring with a cereal product base or a dry base soluble in water, but also with a base such as magnesia, both products being digestable, attractive in appearance and desirable in taste. It may be stored for a considerable length of time while retaining all of its desirable characteristics at a most economical cost. The first described flavor is suitable for potato chips in particular, the cereals merely diluting the acid, which is the flavor. The second described type of dry lemon flavor is suitable for fruits, such as fruit salad or canned peaches. By merely sprinkling the dry lemon flavoring on the fruit, the degree of sweetness is desirably cut and the flavor improved, without changing the consistency of the product in any sense. The flavoring product may be applied after manufacture, or if desired incorporated in the food product to be flavored when the latter is prepared. This last for example in candy such as fondant.

It is thought that the invention and many of its attendant advantages will be understood from the foregoing description, and it will be apparent that various changes may be made in the use of ingredients and their proportions and in the steps of the process of preparing the same without departing from the spirit and scope of the invention or sacrificing all of its material advantages, the novel composition and process hereinbefore described being merely a preferred embodiment thereof.

What is claimed is:

1. A dry lemon food flavoring composition consisting of a base of approximately four parts of crushed dry cereal, one-eighth part powdered citric acid, one-eighth part comminuted cheese, and one-sixteenth part black pepper.

2. A dry lemon food flavoring composition consisting of the following ingredients mixed and combined in approximately the proportions stated: one-eighth part powdered citric acid, one-eighth part comminuted cheese, one-sixteenth part black peper, four parts crushed dry ice cream cones.

3. A dry lemon food flavoring composition consisting of the following ingredients and proportions thereof: 92% crushed dry ice cream cones or cereal product, 3% powdered citric acid, 3% Parmesan or similar cheese, 2% black pepper.

4. The method of preparing a lemon flavor spread composition which consists in mixing thoroughly in the dry state approximately 92% crushed dry ice cream cones or cereal product; 3% powdered citric acid; 3% Parmesan or similar cheese and 2% black pepper, and incorporating in said mixture an edible oil to form a spread for foods.

References Cited in the file of this patent

UNITED STATES PATENTS

| | | |
|---|---|---|
| 186,712 | Clotworthy | Jan. 30, 1877 |
| 1,285,555 | Bradley | Nov. 19, 1918 |
| 1,701,084 | Richardson et al. | Feb. 5, 1929 |
| 2,258,567 | Epstein et al. | Oct. 7, 1941 |